United States Patent [19]

Weis et al.

[11] Patent Number: 5,801,865
[45] Date of Patent: Sep. 1, 1998

[54] RADIO-TELECOMMUNICATION DEVICE IN VEHICLES

[75] Inventors: Bernd Weis, Korntal-Münchingen; Heinz Schlesinger, Mundelsheim, both of Germany

[73] Assignee: Alcatel N.V., Amsterdam, Netherlands

[21] Appl. No.: 861,185

[22] Filed: May 21, 1997

Related U.S. Application Data

[63] Continuation of Ser. No. 563,559, Nov. 28, 1995, abandoned, which is a continuation of Ser. No. 184,588, Jan. 21, 1994, abandoned.

[30] Foreign Application Priority Data

Jan. 23, 1993 [DE] Germany ............... 43 01 816.5

[51] Int. Cl.$^6$ ............................................. H04B 10/00
[52] U.S. Cl. .................... 359/145; 359/120; 455/517; 370/466
[58] Field of Search ..................... 359/115, 125, 359/152, 154, 172, 173, 118, 120, 145; 455/89, 99, 345, 517; 370/310, 465, 328, 466

[56] References Cited

U.S. PATENT DOCUMENTS

| | | | |
|---|---|---|---|
| 4,009,375 | 2/1977 | White et al. | 455/99 |
| 4,731,769 | 3/1988 | Schaefer et al. | 455/345 |
| 4,804,937 | 2/1989 | Barbiaux et al. | 340/52 |
| 5,007,050 | 4/1991 | Kasparian et al. | 359/152 |
| 5,086,510 | 2/1992 | Guenther et al. | 455/90 |
| 5,185,857 | 2/1993 | Rozmanith et al. | 395/148 |
| 5,239,700 | 8/1993 | Guenther et al. | 455/158.4 |
| 5,247,705 | 9/1993 | Attig et al. | 455/74 |
| 5,289,183 | 2/1994 | Hassett et al. | 340/905 |
| 5,301,353 | 4/1994 | Borras et al. | 359/172 |
| 5,420,794 | 5/1995 | James | 364/436 |
| 5,450,471 | 9/1995 | Hanawa et al. | 379/58 |
| 5,471,389 | 11/1995 | Hahlganas | 364/424.05 |

FOREIGN PATENT DOCUMENTS

| | | | |
|---|---|---|---|
| 0065636 | 4/1985 | Japan | 359/115 |
| 0097745 | 5/1985 | Japan | 359/172 |
| 0303232 | 12/1990 | Japan | 359/145 |
| 3283725 | 12/1991 | Japan | 359/115 |

*Primary Examiner*—Wellington Chin
*Assistant Examiner*—Rafael Bacarts
*Attorney, Agent, or Firm*—Ware, Fressola, Van Der Sluys & Adolphson LLP

[57] ABSTRACT

A telecommunication device (11) for vehicle installation is proposed, which is equipped with an HF-transmitting and receiving device (22, 23), with different terminals and with a transmission network (19) between the HF-transmitting and receiving device and the terminals. The telecommunication-specific part of each terminal is physically separated from the actual user part (12, 13, 14) of the terminal, and installed in a central terminal control (15), which is connected with the HF-transmitting and receiving device (22). An efficient, optical transmission network (19) may be provided between the terminal control (15) and the user parts (12, 13, 14) of the terminals. Both the central terminal control (15) and the user parts (12, 13, 14) of the terminals are equipped with an interface unit for the transmission network (19). The telecommunication device (11) is less voluminous than a conventional device with individual terminals, and therefore more suitable for installation in the vehicle.

9 Claims, 2 Drawing Sheets

RADIO-TELECOMMUNICATION DEVICE IN VEHICLES

This application claims the benefit of the following:
This application is a continuation of application Ser. No. 08/563,559 filed on Nov. 28, 1995, now abandoned, which is a continuation application Ser. No. 08/184,588 filed on Jan. 1, 1994, now abandoned.

TECHNICAL FIELD

The present invention relates to radio-telecommunication devices, including the combination of such devices in a central terminal controller.

BACKGROUND OF THE INVENTION

Radio-telecommunication devices in vehicles, particularly in motor vehicles, consist of individual terminals, such as a radio-telephone and a fax machine. These terminals are interconnected by analog or digital interfaces, so that voice and data can be wirelessly exchanged within a radio network via the HF-transmitting and receiving device of the radio-telephone. In known radio networks, such as the GSM (Global System for Mobile Communications), the subscriber can use different services (voice, fax, data), by selecting the corresponding terminal. Since the individual terminals are relatively voluminous, it is difficult to accommodate several of these terminals in vehicles, which is a necessity for a mobile office. It is furthermore difficult to interconnect the many terminals that are needed for as many different services as possible, in a user-friendly arrangement.

The task of the present invention is therefore to make a radio-telecommunication device available in vehicles, so that the individual terminals are less voluminous and therefore easier to accommodate inside the vehicle, and to lower the construction cost of the individual terminals.

SUMMARY OF THE INVENTION

To fulfill this task, a radio-telecommunication device is provided in vehicles, particularly in motor vehicles, with an HF-transmitting and receiving device, with different terminals (e.g. telephone, facsimile transmitter (fax machine)), whose radio-telecommunication-specific parts are physically separated from the user parts and are interconnected by a transmission network, and with a central terminal control, which contains the telecommunication-specific parts of the terminals, and which is connected to the HF-transmitting and receiving device.

The invention requires only a single central terminal control to develop the protocol and to control the terminals within the radio-telecommunication device. By integrating the telecommunication-specific parts of all terminals, the number of the necessary components is reduced to a minimum. This also implies considerable cost savings. The only non-integrated parts are the significantly smaller user parts of the terminals. The small volume of the respective user part makes it possible to individually accommodate the user parts inside the motor vehicle. In addition, the radio-telecommunication device is expandable. Concentrating the telecommunication-specific parts reduces interference.

Advantageous configurations of the invention can be found in the subclaims.

Accordingly, an optical bus with plug contacts may be used which means considerable flexibility for the installation in different types of vehicles. After such a transmission network is installed in a vehicle, it is possible to retrofit further terminals in a simple and cost-effective manner.

BRIEF DESCRIPTION OF THE DRAWINGS

Further details of the invention can be found in the following description, which explains the invention in greater detail by means of the configuration examples illustrated in the drawings, which schematically depict.

BEST MODE FOR CARRYING OUT THE INVENTION

Figure 1:
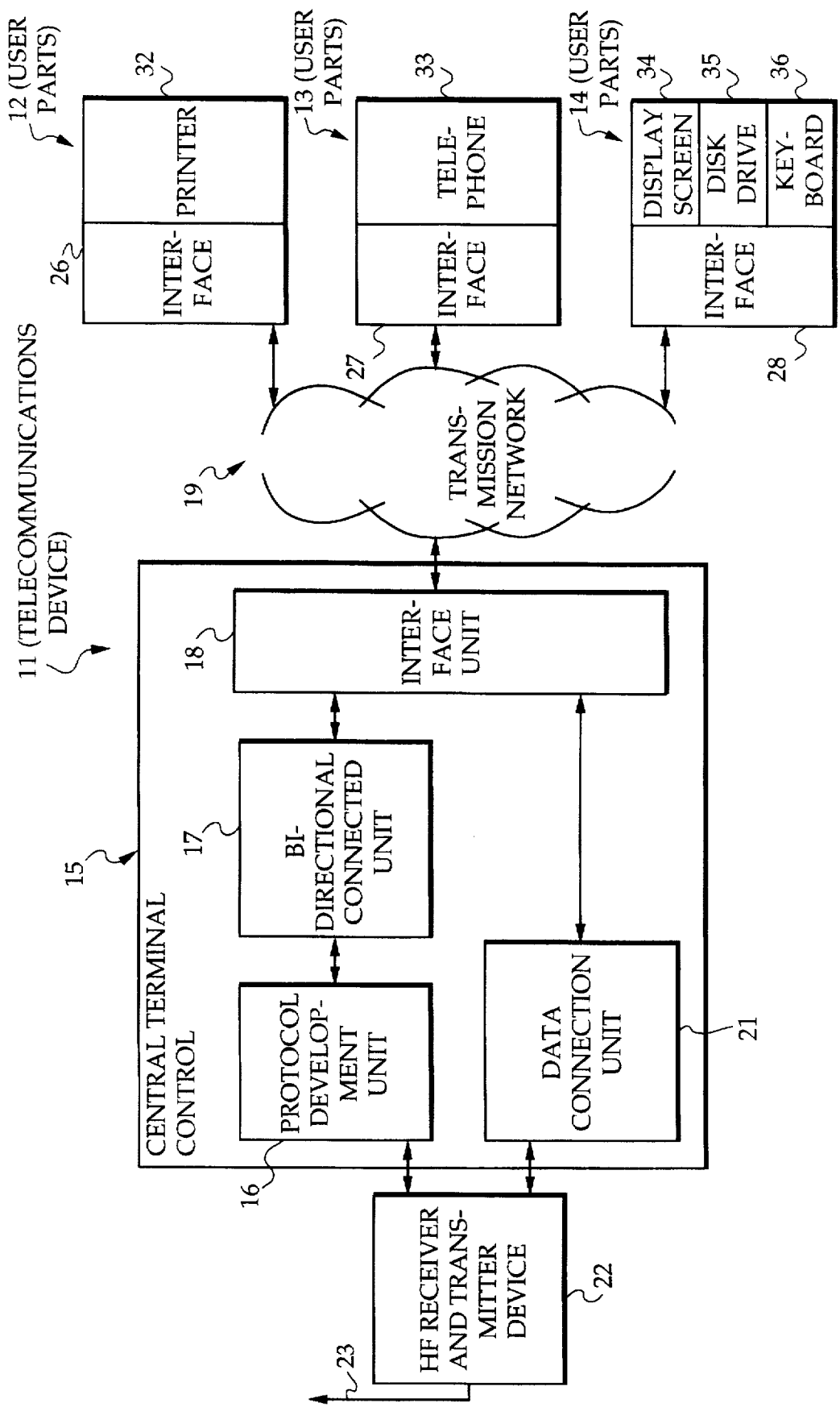
FIG. 1, the block circuit diagram of a telecommunication device for vehicles according to the invention.

The preferred configuration example in FIG. 1 is a telecommunication device 11, which is suitable for installation in vehicles, particularly motor vehicles. The individual terminals used in the motor vehicle are physically separated into their actual user parts 12, 13 or 14, and their telecommunication-specific parts. The telecommunication-specific parts are installed in a central terminal control 15.

The central terminal control 15 therefore contains the telecommunication-specific part of each connected and still to be connected terminal. This is the part of the respective terminal that performs all the control and signal processing functions. By contrast, the user part of the respective terminal contains the input/output means, such as a microphone, receiver and/or keyboard. The user part is therefore the man/machine interface of the respective terminal. As shown in FIG. 1, the central terminal control 15 contains a unit 16 for protocol development, a bidirectionally connected unit 17 for the service selection and minimum signalization of the terminal, and a bidirectionally connected unit 18 to interface with a transmission network 19. In addition, the central terminal control 15 contains a unit 21 for the connection of data to the terminal and for data format adaptation. This unit 21 is bidirectionally connected to the protocol development unit 16, as well as to the interface unit 18.

On the input side, the central terminal control 15 is bidirectionally connected through both the protocol development unit 16 and the data connection unit 21 to an HF-transmitting and receiving device 22, to which an antenna 23 is connected.

On the output side, the central terminal control 15 is bidirectionally connected through the interface unit 18 to the transmission network 19. The transmission network 19 can have multiple configurations inside a motor vehicle, such as a copper cable, an optical bus system, particularly a CAN (Control Area Network).

The transmission network 19 is bidirectionally connected to interfaces 26, 27 and 28, which are respectively accommodated in one of the user parts 12, 13, 14 of the corresponding terminal device.

This example contains a fax machine, a telephone and a PC as the terminals. This means that the user part 12 of the fax machine includes a printer 32 connected through interface 26, the user part 13 of the telephone includes a telephone receiver 33 equipped with a dialing keyboard connected through interface 27, and that user part 14 of the PC includes a display screen 34, a diskette drive 35 and a keyboard 36 connected through interface 28. It is also possible to physically separate the display screen, the diskette drive and/or the keyboard.

The central terminal control 15, which is connected on the receiving and the transmitting side with the common HF-transmitting and receiving device 22, has the following functions;

(a) Development of a radio protocol; in other words, the central terminal control 15 is a signalization point e.g. for a GSM protocol being used;

(b) Development of a protocol for control of the user parts 12, 13, 14 of the terminals;

(c) Installation and removal of a digital voice and/or data connection to the user parts 12, 13, 14 of the terminals;

(d) Data conversion (voice, text, control signals) into a format that can be received by a specific user part 12, 13, 14; and (e) Adaptation of the interface to the transmission network 19.

The communication between the central terminal control 15 and the user part 12, 13, 14 of the respective terminal must be configured as simply as possible. In the simplest case it only consists of a data line by which the signals are transmitted to the user part 12, 13, 14 of the corresponding terminal, such as the activation and deactivation of user parts 12, 13, 14 of the terminals in use, by means of suitable control signals, to save energy.

Figure 2:
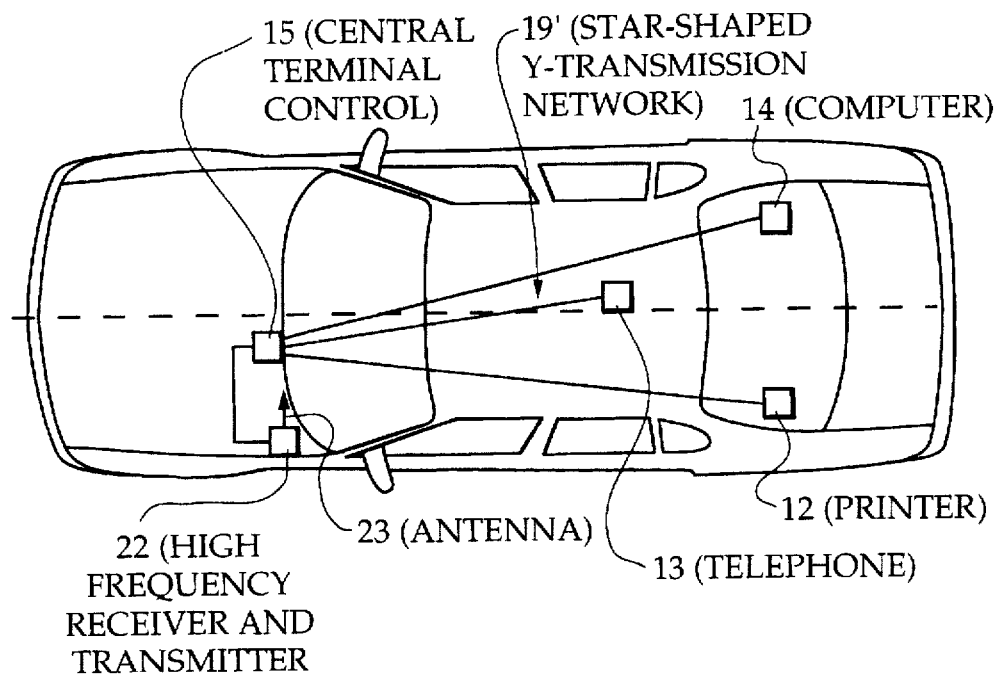
FIG. 2, a possible arrangement of the individual units of the telecommunication device in FIG. 1 in a passenger car, and FIG. 3, a variation of that arrangement.

FIG. 2 schematically shows how the individual components of the telecommunication device, including the transmission network, are accommodated in a passenger car. The central terminal control 15, which is connected to the antenna 23 and the HF-transmitting and receiving device 22, is located in the dashboard area. Beginning with the central terminal control 15, this variation contains a star-Y-shaped transmission network 19', whose individual lines lead from the central terminal control 15 to the individual user parts 12, 13, 14 in the form of a Y-star. This star-Y-shaped transmission network 19' is located accordingly inside the passenger car.

The user part 12 with the printer 32, which is only controlled by the respective printing sequences of the pixels, is attached to the back of the seat. The user part 13, with the telephone receiver 34 and the integrated dialing keyboard, is installed e.g. in the center console between the two front seats. Of the remaining user part 14, the display screen 34 is advantageously installed in the neck-support or the back of a seat, the diskette drive 35 in an arm rest, and the keyboard 36 can be folded into the back of a seat.

Figure 3:
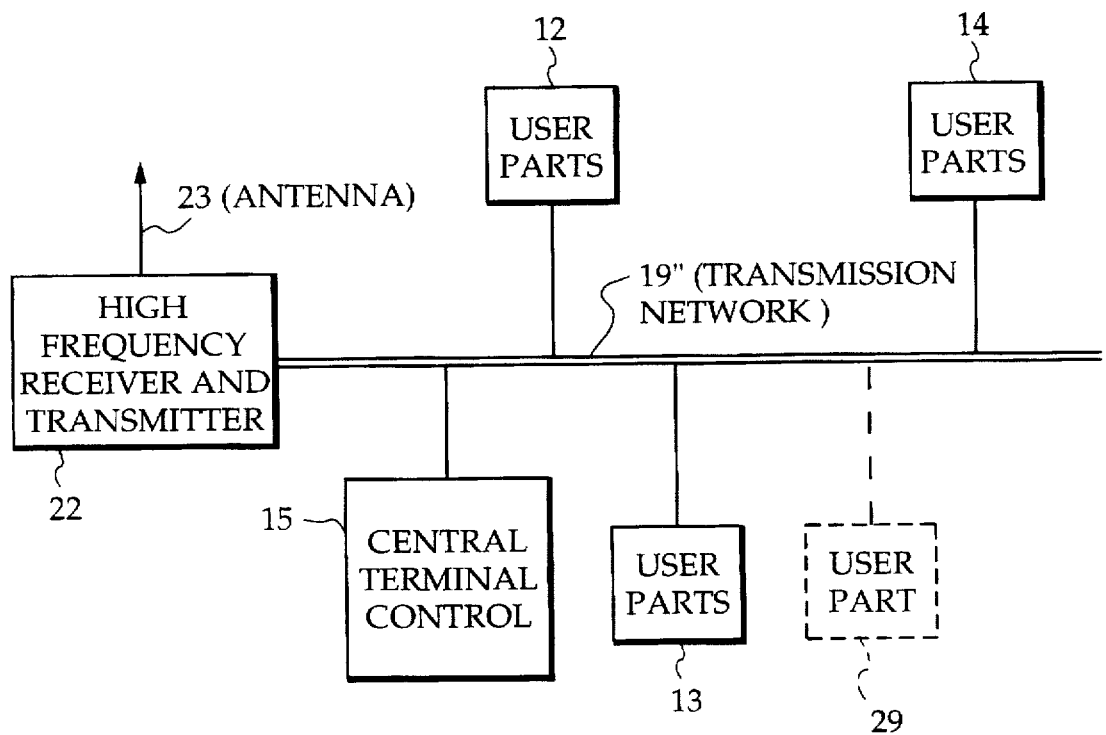

In the variation shown in FIG. 3, a bus system is used as the transmission network 19", which is equipped with removable plug connectors, to which the individual user parts 12, 13, 14 can be connected and disconnected. Other plug connectors are provided for user parts 29 to be installed in the future. The transmission network 19", built in the form of a bus system, can therefore be expanded with user parts of other terminals by means of simple and cost-effective retrofitting.

This added terminal could be a navigation device 29, such as a GPS (Global Position System) receiver, which is either already contained in the central terminal control 15, or can be installed as an additional module. Other already existing components can also be assigned to the user part 29, such as the PC screen to display a street or a city map, and/or the keyboard for entering the corresponding search commands. In addition, the fax machine's printer can also be used for user part 29, perhaps for printing navigation cards. In this way, other terminals can be integrated into the motor vehicle, without the excessive use of user part components.

The configuration of the invention described here is only an example of many configurations that can be imagined. The invention can be used in all vehicles, i.e. in land, water and air vehicles, particularly those in which large mobile telecommunication installations are desirable for a large number of passengers, such as for example in trains or airplanes. The use of the invention can therefore also be imagined as an integral mobile radio-telecommunication device inside future land and satellite-supported, intercontinental mobile radio networks, such as for example in the UMTS (Universal Mobile Telecommunications System), or in the TFTS (Terrestrial Flight Telephone System). Furthermore, the invention is particularly advantageous for mobile multi-media communication, such as mobile teleconferences.

What is claimed is:

1. A radio-telecommunication device (11) for vehicles, comprising:

an HF-transmitting and receiving device (22), a plurality of terminals each having user specific parts (12, 13, 14) for providing respective user interfaces, the plurality of terminals having different input-output means (32–36) that are interconnected to perform different telecommunication services, including services associated with a printer, a facsimile, a telephone, and a personal computer, and a central terminal control (15) having radio-telecommunication specific parts for providing control and signal processing functions for the plurality of terminals, the radio-telecommunication specific parts being physically separated from the user specific parts (12, 13, 14) and being interconnected thereto by a transmission network (19), and the central terminal control (15) being connected to the HF-transmitting and receiving device (22), wherein the central terminal control (15) has an interface unit (18) that interfaces with the transmission network (19) to perform the different telecommunication services, as well as has units for selecting services (17) and for data formatting (21), for controlling an exchange of signalling data between the telecommunication-specific parts and the user specific parts (12, 14) to perform one of the different telecommunication services with one of the input-output means (32–36) of the respective user specific parts (12, 13, 14).

2. A radio-telecommunication device (11) according to claim 1, wherein the user specific parts (12, 13, 14) of the terminals contain different input/output means (32, 33, 34, 35, 36), and the telecommunication device (11) contains only one of each different input/output means (32, 33, 34, 35, 36).

3. A radio-telecommunication device (11) according to claim 2, wherein the input/output means (32, 33, 34, 35, 36) include a receiver (33) of a telephone (13), and a printer (32) for a fax machine (12) or a personal computer or navigation device.

4. A radio-telecommunication device (11) according to claim 3, wherein the personal computer or navigation device includes a display screen (34) and a keyboard (36).

5. A radio-telecommunication device (11) according to claim 1, wherein the transmission network (19) is a star-Y-shaped network (19') which emanates from the central terminal control (15).

6. A radio-telecommunication device (11) according to claim 1, wherein the radio-telecommunication device (11) is used in airplanes or rail vehicles, and the transmission network (19) is a bus system (19") with coupling elements.

7. A radio-telecommunication device (11) according to claim 6, wherein the transmission network (19) is a fiber-optic network.

8. A radio-telecommunication device (11) according to claim 5, wherein the transmission network (19) is a fiber-optic network.

9. A radio-telecommunication device (11) for a vehicle that provides different telecommunication services including telephone service, facsimile service, and personal computer service, between the vehicle and a global system mobile communication network, comprising:

- an HF-transmitting and receiving device (22) for exchanging voice, text and control data signals for the different telecommunication services between the vehicle and the global system mobile communication network;
- a plurality of vehicular telecommunication terminals, each for providing a respective telecommunication service, having a respective user specific part (12, 13, 14) for providing a user interface, and having a respective user interface unit (26, 27, 28) connected to a transmission network (19); and
- a central terminal control (15) being connected to the HF-transmitting and receiving device (22) for exchanging the voice, text and control data signals for the different telecommunication services, having integrated radio-telecommunication specific parts (17, 18, 19) for all of the vehicular telecommunication terminals (12, 13, 14) to provide centralized control and signal processing functions for the telecommunication services between the vehicle and the global system mobile communication network, having a bidirectionally-connected interface unit (18) for connecting the radio-telecommunication specific parts (17, 18, 19) to respective user interface units (26, 27, 28) via the transmission network (19), having a bidirectionally-connected select telecommunication service unit (17) for selecting the telecommunication services for the vehicle, having a bidirectionally-connected data formatting unit (21) for converting the voice, text and control data signals for the different telecommunication services into a data format that can be received by respective user specific parts (12, 13, 14), and having a bidirectionally-connected protocol development unit (16) for a protocol to control the respective user specific parts (12, 13, 14) of the vehicular telecommunication terminals for providing the different telecommunication services between the vehicle and the global system mobile communication network.

\* \* \* \* \*

UNITED STATES PATENT AND TRADEMARK OFFICE
CERTIFICATE OF CORRECTION

PATENT NO. : 5,801,865
DATED : September 1, 1998
INVENTOR(S) : Weis et al.

It is certified that error appears in the above-identified patent and that said Letters Patent is hereby corrected as shown below:

On the Title page, item [56], References Cited, Foreign patent Documents, please add:

--0199916  12/1986 EPO-- and
--9300752  01/1983 PCT--.

Column 4, line 21, please delete "central".

Column 4, line 21, after "having" insert --centralized--.

Column 4, line 24, after "terminals" insert
--eliminating the need for radio-telecommunication specific parts in the plurality of terminals--.

Column 4, line 27, after "the" please delete "central".

Column 4, line 30, after "the" please delete "central".

Column 5, line 17, after "a" please delete "central".

Column 5, lines 20-21, after "integrated" please insert
--centralized--.

Column 6, line 1, after "provide" please delete "centralized".

Column 6, line 4, after "network" please insert
--eliminating the need for radio-telecommunication specific parts in the plurality of terminals--.

Signed and Sealed this

Eighth Day of June, 1999

Attest:

Q. TODD DICKINSON

*Attesting Officer*   *Acting Commissioner of Patents and Trademarks*

UNITED STATES PATENT AND TRADEMARK OFFICE
CERTIFICATE OF CORRECTION

PATENT NO : 5,801,865
DATED : September 1, 1998
INVENTOR(S): Weis et al.

It is certified that error appears in the above-identified patent and that said Letters Patent is hereby corrected as shown below:

On the Title page, Item [56], under References Cited, Foreign Patent Documents, please delete "9300752 01/1983 PCT" added in June 8, 1999 Certificate of Correction and insert -- 9300752 01/1993 PCT--.

Signed and Sealed this

Twelfth Day of October, 1999

*Attest:*

Q. TODD DICKINSON

*Attesting Officer*     *Acting Commissioner of Patents and Trademarks*